United States Patent
Gutiérrez et al.

[11] Patent Number: 6,146,515
[45] Date of Patent: Nov. 14, 2000

[54] POWER SUPPLY AND METHOD FOR PRODUCING NON-PERIODIC COMPLEX WAVEFORMS

[75] Inventors: Enrique Gutiérrez, Arlington Hts.; Bonifacio Diaz, Chicago, both of Ill.; Rogelio Valenzuela, Chihuahua, Mexico

[73] Assignee: Tecnu, Inc., Arlington Heights, Ill.

[21] Appl. No.: 09/212,939

[22] Filed: Dec. 16, 1998

[51] Int. Cl.[7] ................................................. C25D 21/12
[52] U.S. Cl. ...................... 205/81; 204/229.5; 204/230.6
[58] Field of Search ........................... 204/229.5, 230.6; 205/81

[56] References Cited

U.S. PATENT DOCUMENTS

| | | | |
|---|---|---|---|
| 3,662,804 | 5/1972 | Mitchell | 307/252 T |
| 3,983,014 | 9/1976 | Newman et al. | 204/58 |
| 4,338,176 | 7/1982 | Garcia Perez | 204/228 |
| 4,430,178 | 2/1984 | Anderson et al. | 204/114 |
| 4,517,059 | 5/1985 | Loch et al. | 204/14.1 |
| 4,608,138 | 8/1986 | Kobayashi | 204/129.3 |
| 4,839,002 | 6/1989 | Pernick et al. | 204/58 |
| 4,863,579 | 9/1989 | Asaoka | 204/224 M |
| 5,007,993 | 4/1991 | Hull et al. | 204/228 |
| 5,273,642 | 12/1993 | Crites et al. | 205/118 |
| 5,486,280 | 1/1996 | Bullock, IV et al. | 205/67 |
| 5,736,370 | 4/1998 | Zhao et al. | 435/173.6 |

OTHER PUBLICATIONS

Faraday Technology, Inc. newletter, distributed at a trade show Jan. 25, 1999.

*Primary Examiner*—Kathryn Gorgos
*Assistant Examiner*—Thomas H. Parsons
*Attorney, Agent, or Firm*—Wallenstein & Wagner, Ltd.

[57] ABSTRACT

A power supply for producing complex non-periodic waveforms from a sum of periodic waveforms is disclosed. The power supply includes a controller which measures the output signal and compares it to the desired signal in order to produce an error signal. The error signal is fed to the power stage and is used to modify the input signal and produce the desired output. The desired signal is programmed by the user by selecting a plurality of pre-defined stored waveforms, modifying them, and arranging them such that the desired complex non-periodic waveform is created. The user can enter the instructions for modifying and arranging the waveforms via a panel having a keypad and display, or using a computer running software which enables the user to modify the stored waveforms on-screen. Such control is particularly useful in industries in which a very specific complex output signal is desirable, such as in the electrolytic plating industry. An optional process feedback system may be employed to monitor and respond to plating process variables.

22 Claims, 5 Drawing Sheets

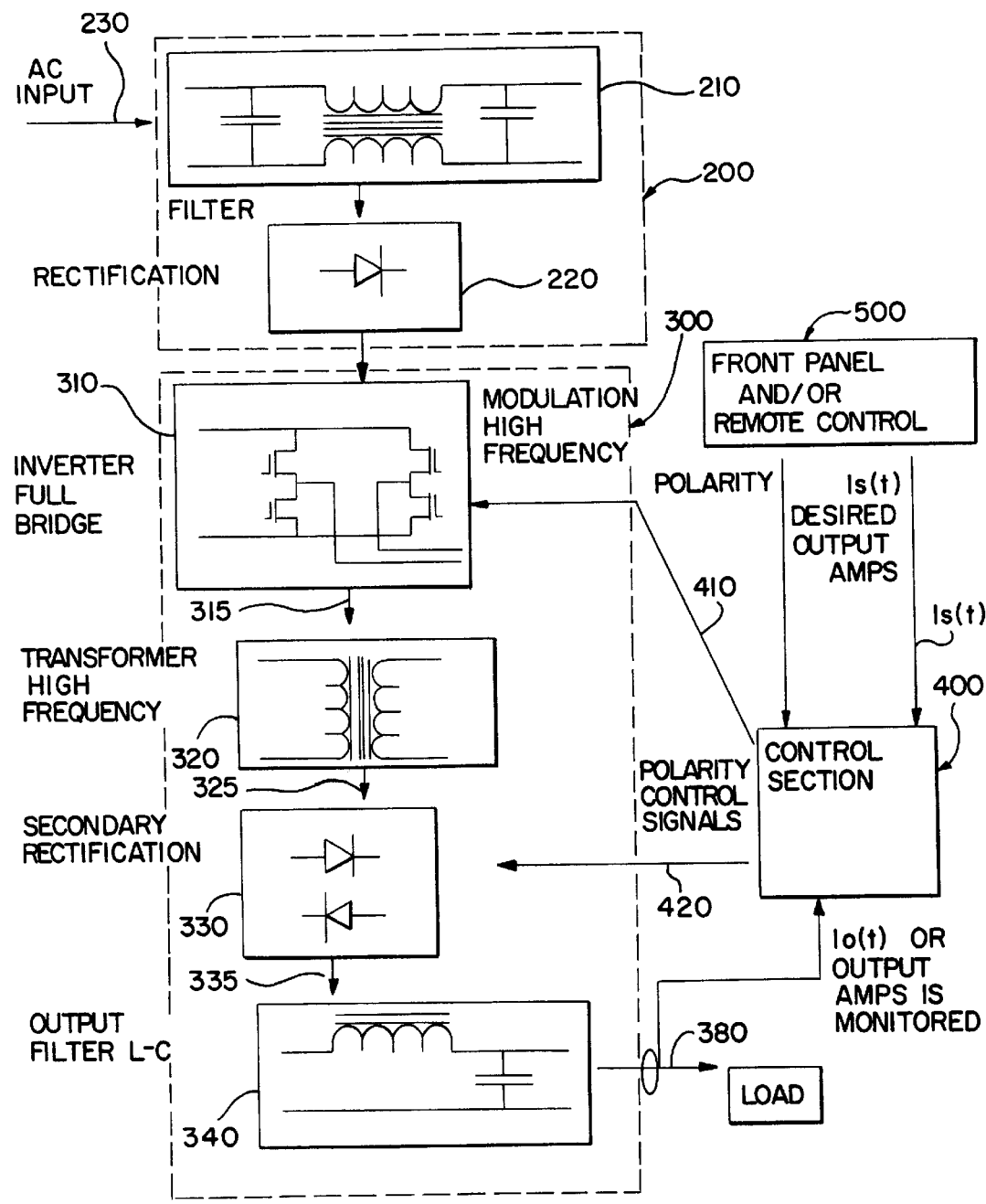

POWER SUPPLY AND METHOD FOR PRODUCING NON-PERIODIC COMPLEX WAVEFORMS

BACKGROUND OF THE INVENTION

1. Field of the Invention

The present invention relates to power supplies. More particularly, the present invention relates to a power supply for producing complex non-periodic waveforms from a sum of stored waveforms.

2. Description of the Related Art

Numerous industries utilize power supplies for various purposes. For certain applications, it is desirable to have a certain degree of control over the output of power supplies. For example, electrolytic plating requires power to be supplied to the electrodes in a manner so as to properly plate an object. Plating tends to build up around edges and sharp protrusions. The more irregularly shaped the object to be plated is, the more difficult it is to apply a uniform layer of metal.

Due to increasing complexity of objects requiring plating, particularly in the micro-electronics industry, the need for power supplies allowing for precise control over the signals produced has grown. Signals which produce pulses having varying positive and negative magnitudes are needed to gradually build up metal layers on surfaces, and to remove excess build-up in problematic areas are a necessity.

Prior devices which offer some degree of control in the electrolytic plating industry are limited in their flexibility and restrict the user to periodic pulsed signals. One such device is disclosed in U.S. Pat. No. 5,273,642 to Crites et al. Crites et al. disclose an apparatus for electroplating wafers in which a programmable controller is used to regulate a waveform. While such controllers are useful for relatively simple surfaces, they restrict the user to programming periodic waveforms, and do not enable the user a full range of control over the waveforms.

U.S. Pat. No. 4,517,059 to Loch et al., discloses a similar power supply device which provides a varying waveform for an electrolytic process. Forward and reverse pulses are provided by means of feedback and a pre-programmed microprocessor. U.S. Pat. No. 4,863,579 to Asaoka also discloses a power supply device for electrolytic plating in which various pulses are discharged as determined by a command center. These devices offer the user very limited control over the waveforms, and are thus insufficient for plating complex surfaces. Furthermore, when different types of waveforms are required to accomplish different tasks or separate stages of the plating process, such stages are not readily combined into one stage or process using the above devices.

Therefore, there is a need for a power supply device which can be easily controlled and programmed by the user to provide a full range of waveforms in order to optimize the resulting plating process.

SUMMARY OF THE INVENTION

In view of the above prior art deficiencies, it is an object of the present invention to provide a power supply device with improved flexibility and user control.

It is a further object of the present invention to provide a power supply device which enables the user to program an optimal waveform output for electrolytic plating of complex surfaces.

It is still a further object of the present invention to provide a power supply device which enables the user to program a complex non-periodic waveform output.

It is yet a further object of the present invention to provide a power supply device which enables the user to program a complex non-periodic waveform output from a sum of stored user-controlled waveforms.

It is an additional object of the present invention to provide a power supply device which produces a complex non-periodic waveform output responsive to feedback from the cathodic surface.

It is still another object of the present invention to provide a device which can be easily programmed to incorporate separate tasks during the plating process into one stage, separate tasks being accomplished by different portions of a complex waveform output.

Accordingly, the present invention is a power supply device, particularly for supplying power for electrolytic plating, in which the user is able to program the desired waveform output. The power supply device comprises an input filter and rectification portion, a power stage, a control portion, and a user interface portion. Optionally, a feedback portion may be included to provide feedback from the cathodic surface during plating.

The user interface can comprise a front panel with display and keypad, or a computer connected by remote port. The user interface is particularly well adapted to enable the user to easily program the desired waveform output, to assemble the process by selecting a sequence of programmable jobs, and to store and modify existing waveforms. The user can thus program a complex waveform output as a sum of periodic waveforms. The ease and flexibility with which the device may be programmed allows for optimal usage in the field.

Other features and advantages of the invention will be apparent from the following specification taken in conjunction with the following drawings.

BRIEF DESCRIPTION OF THE DRAWINGS

FIG. 1 is a block diagram of the power supply circuitry of the present invention.

DETAILED DESCRIPTION OF THE PREFERRED EMBODIMENT

Figure 2A:
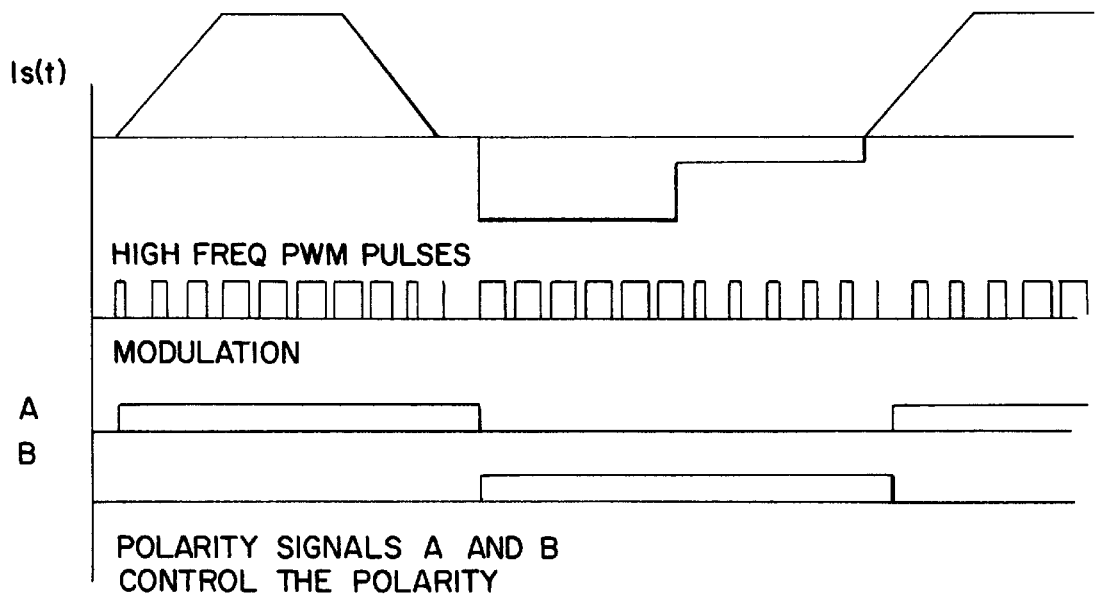
FIGS. 2A and 2B show a graphical representation of the modulation and relative value of the LC filter of the present invention needed to perform demodulation.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The input power for the power supply device of the present invention is typically AC power single phase, or three phase. Referring to FIG. 1, the device preferably comprises an input filter and rectification portion 200. The primary function of filter 210 is to limit the electromagnetic interference generated in the power stage 300 from exiting the rectifier and causing electromagnetic pollution. The rectifier 220 preferably consists of rectification diodes. The input is thus converted to DC power and fed to the power stage 300 as power input 230. Portion 200 may optionally be incorporated into power stage 300 if an AC to DC converter is utilized.

The power stage 300 receives power input 230, modifies it as determined by the control portion 400, and produces actual output 380 which is applied to the plating apparatus. Preferably, power stage 300 comprises a full bridge inverter 310 which converts the DC power input 230 into high frequency pulses (HFPs) 315. The HFPs 315 are either increased or decreased as controlled by the modulation signal 410 as received by the full bridge inverter 310.

The full bridge inverter 310 is preferably formed using four solid state semiconductor switches, typically Field Effect Transistors (FETs) or Injection Gate Bipolar Transistors (IGBTs). There are several modulation methods which may be employed. First, pulse width modulation may be used to produce higher HFPs proportional to the duty cycle. Second, frequency shift modulation may be used to produce higher HFPs proportional to greater phase shift. Finally, resonant mode, or fixed pulses at varying intervals may be used to produce higher HFPs proportional to the number of pulses per unit time.

The HFPs 315 are fed into a high frequency transformer 320 which provides isolation and step-down or step-up voltage or current conversion as necessary for the particular application. For example, for copper plating, the voltage may be stepped down so that the current output is 30 times higher than the input. The transformer output 325 is then fed to a secondary rectification portion 330.

At this stage, the transformer output 325 is in the form of high frequency AC voltage. The secondary rectification portion 330 rectifies this signal, either positively or negatively, in accordance with the polarity signal 420 received from the control portion 400. The rectification can be implemented by various means. In a preferred embodiment, rectification is accomplished using semiconductor switches as controlled diodes. The switches can be either MOSFETs or IGBTs, and can act as either positive polarity diodes or negative polarity diodes. The rectified signal 335 is fed into an LC filter 340.

Figure 2B:
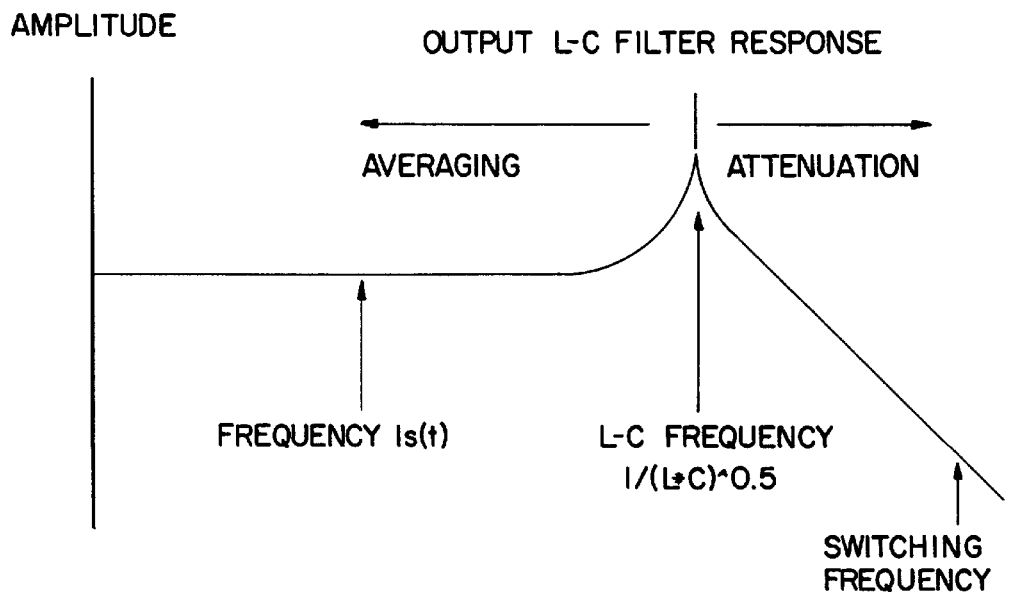

The LC filter 340 demodulates the rectified signal 335 and produces actual output 380. The LC filter 340 attenuates the HFPs and averages or demodulates the desired signal Is(t). The higher the switching frequency of the full bridge inverter 310, the smaller the LC filter 340 may be, and thus the faster the actual output 380 may respond to the desired signal Is(t). FIGS. 2A and 2B show a graphical representation of the modulation and relative value of the LC filter needed to perform the demodulation.

Several modifications may be made to power stage 300 in order to achieve similar results. Any desired signal can be produced using any of the modifications, such as pulse reverse waveforms, etc.

Figure 3:
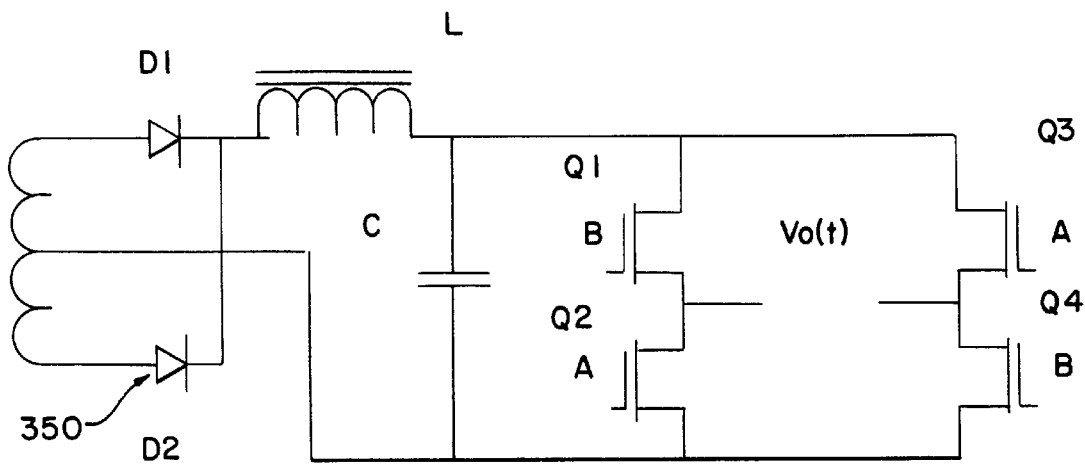
FIG. 3 is a circuit diagram of a first modification to the power stage of the present invention.

In the first modification, (referring to FIG. 3), after high frequency transformer 320, a full bridge 350 is used, including a center tapped rectifier formed of diodes D1 and D2. The center tapped rectifier produces a DC or a positive pulsing waveform. Semiconductor switches Q1, Q2, Q3, and Q4 (FETs, IGBTs, etc.) can be used to convert the positive DC pulses into negative pulses, depending on the polarity controls. For instance, Q1 and Q4 can be turned on and off simultaneously for negative pulses, and Q2 and Q4 can be turned on and off simultaneously for positive pulses.

Figure 4:
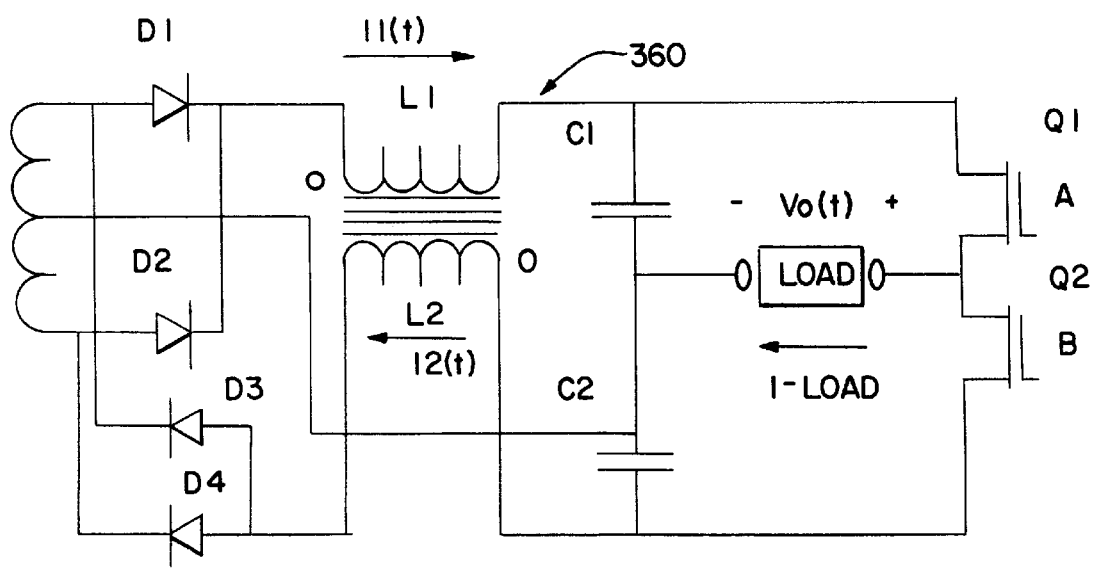
FIG. 4 is a circuit diagram of a second modification to the power stage of the present invention.
Figure 5:
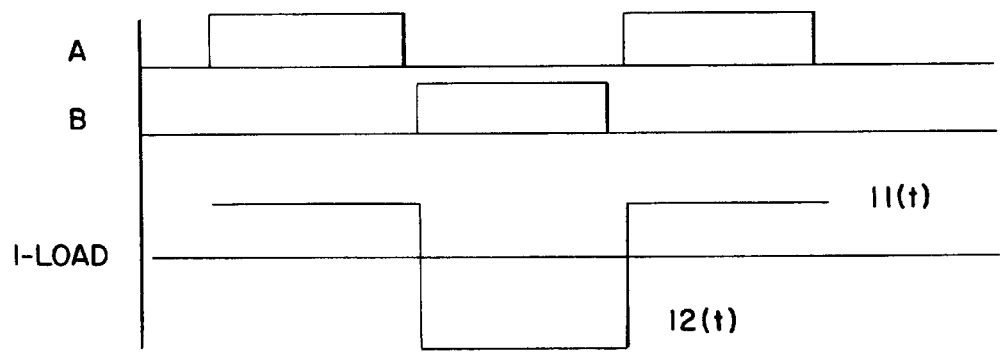
FIG. 5 is a graphical representation of the rapid positive to negative transition resulting from the second modification to the power stage of the present invention.

A second modification to the power stage 300, referring to FIG. 4, requires separate positive and negative rectification followed by a half bridge semiconductor switch 360. Diodes D1 and D2 form a center tapped positive rectification, and diodes D3 and D4 form a center tapped negative rectification, thereby producing both a positive and negative output from the same transformer. Following the rectification, an LC filter is formed as a coupled inductor in which windings L1 and L2 are wound around a common magnetic core. Such an inductor assists in achieving rapid positive to negative transitions in the output. Following the coupled inductor, a half bridge is formed by semiconductor switches Q1 and Q2 (FETs, IGBTs, etc.). Note that Q1 and Q2 are never ON at the same time. When Q1 is ON, the output is positive, and when Q2 is ON, the output is negative. To illustrate the effect of the coupled LC filter, start with Q1 ON. The output will be positive, and output current I1(t) flows through L1. If Q1 is turned OFF, and Q2 is turned ON, because L1 and L2 are coupled, I1(t) will stop flowing through L1 immediately, and I2(t) will flow through L2, but the output is now negative. Thus, the transition from positive to negative output is rapid, as seen in FIG. 5. In certain applications, such as copper plating during the fabrication of PC boards, it is particularly desirable to be able to quickly convert a positive output into a negative output of a different magnitude. Such a result can be obtained by requiring L1 and L2 to have different numbers of turns.

Figure 6:
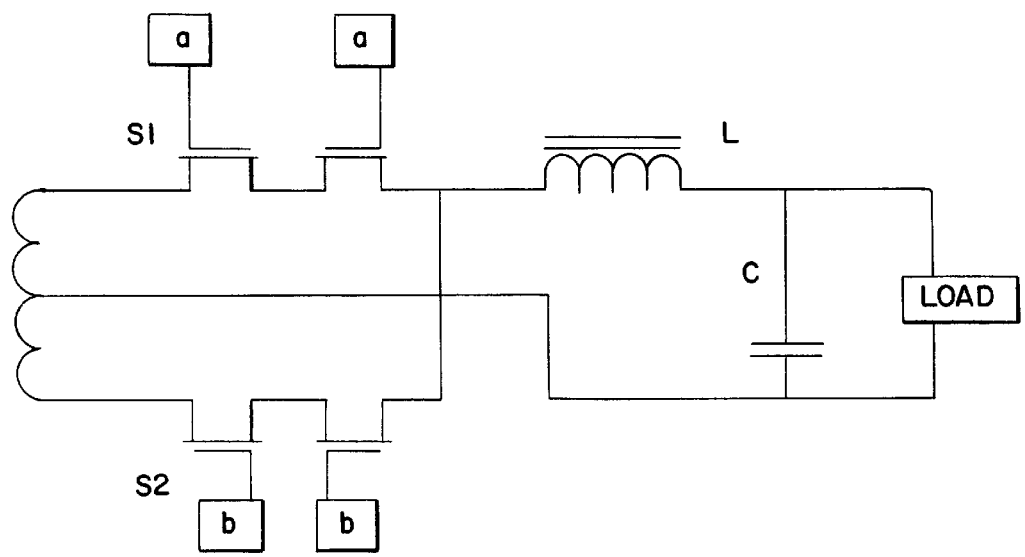
FIG. 6 is a circuit diagram of a third modification to the power stage of the present invention.
Figure 7:
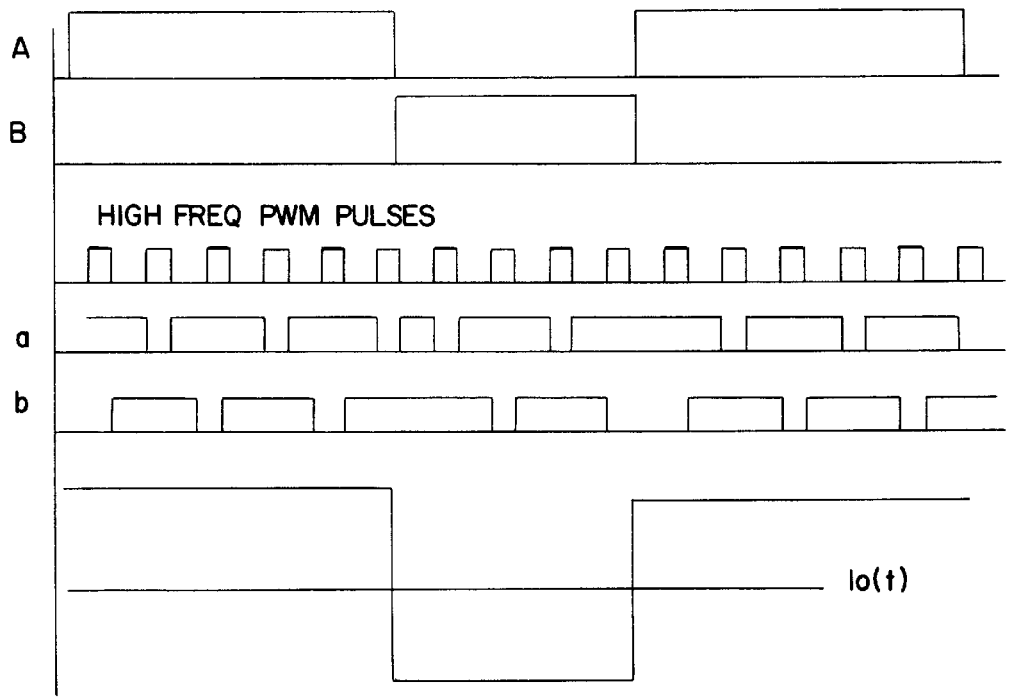
FIG. 7 shows a graphical representation of the output under certain conditions using the third modification to the power stage of the present invention.

A third modification to the power stage is illustrated in FIG. 6. A synchronous rectification with polarity reverse logic is implemented using semiconductor switches in place of diodes. Diodes convert AC to DC since they only conduct in one direction. By turning on the semiconductor switches (FETs, IGBTs, etc.) when the diodes would have been turned on, rectification can also be accomplished, and thus polarity control is achieved. The same polarity reverse illustrated above can be achieved with increased efficiency without the use of any rectification diodes. The semiconductor switches S1 and S2 are preferably formed of two FETs, and the gates or control of S1 are connected to control signal "a" so that both FETs are turned on and off at the same time in order to cancel the inherent diodes present in all FETs from drain to source so that current can flow in either direction through S1. The control circuitry, implemented by a discrete or logic microcontroller, can then determine whether the output will be positive or negative. FIG. 7 illustrates the waveforms needed for the control circuitry of a pulse width modulation (PWM) type control. Signals A and B are polarity control signals used in the above two rectification methods. The PWM supplies information such that S1 and S2 can mimic diodes. For positive rectification, S1 is turned off for every other pulse, and S2 is turned off for every other alternate pulse. To reverse polarity, S1 and S2 are turned off during the opposite pulses. The PWM pulses and polarity control pulses are generated by control portion 400.

The power stage 300 is manipulated by the control portion 400. It is important to understand that the control portion can be selectively operated in a current mode, a voltage mode, or a power mode. Thus, the actual output 380 can be controlled in whichever mode is suitable for the particular application. The control portion 400 measures the actual output 380 and compares it to the desired signal Is(t). The error, in the form of the modulation signal 410 and the polarity signal 420, is fed to the power stage in order to make the actual output 380 follow the desired signal Is(t) (which may be a DC signal or time-varying pulse) as closely as possible.

The control portion 400 may be implemented using an analog amplifier with proper compensation. Preferably, however, a Digital Signal Processor (DSP) is employed with appropriate filtering algorithms. The DSP may advantageously include adaptive control algorithms which "learn" from past experience to improve the response time.

Figure 8:
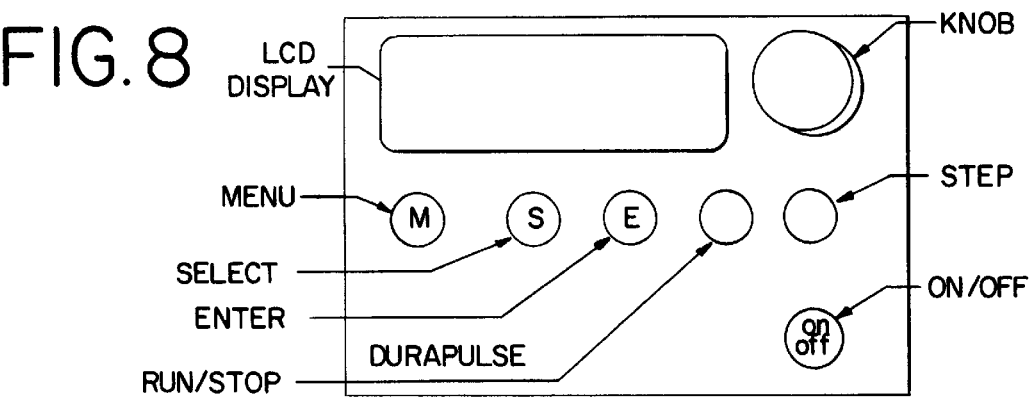
FIG. 8 is a front view of a front panel showing the user interface of the present invention.
Figure 9:
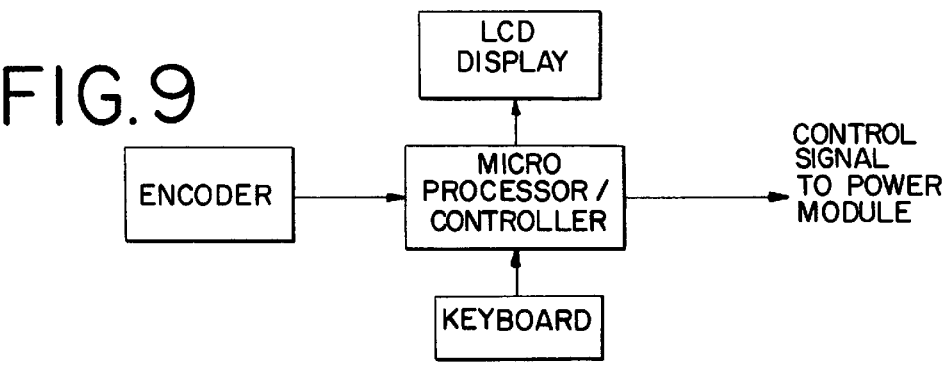
FIG. 9 is a block diagram of the user interface of the present invention.

The desired signal Is(t) may be either an analog time and polarity varying waveform, or a digital waveform existing only in memory. An analog time and polarity varying waveform would typically be generated from an embedded microcontroller via a digital to analog converter. The information for the desired signal Is(t) is obtained from the user via the user interface 500, which can be a front panel 500', as seen in FIG. 8, a remote computer, PLC, or other controller via a remote port, and is used by the analog control section.

If a digital waveform is used, it cannot be seen in analog form. The DSP compares the digital waveform signal to a digitized output if a digital control portion is used.

A key advantage of the device is the ease with which the desired waveform may be programmed by a user. In a preferred embodiment, the user interface 500 comprises an LCD display, six buttons or keys, and a knob (digital encoder), all of which may be situated on a panel 500' of the device. The keys and knob may be used to select and enter numerical values to program waveforms.

The keys and knob have the following functions. The MENU key is used to move from one menu screen to the next. Different menu screens appear in the alphanumeric display, each one allowing the user to program specific parameters. The SELECT key is used to select icons in each of the menu screens so that the value of the icon can be modified. Only one icon can be selected at a time. A blinking cursor appears next to the selected icon. The KNOB is used to modify the value of the icon. The value is then accepted using the ENTER key. The RUN/STOP key is used to enable or disable the output. The STEP KNOB is used to toggle between fine and coarse adjustment for the KNOB. The ON/OFF key is the main power key.

The device can be programmed as follows. A single waveform can be created either by modifying an existing stored waveform, or creating a new waveform. Using the keys and knob described above, a mode is selected (such as voltage, current, or power), and a time is entered for the first portion of the waveform. A RAMP variable may be entered in order to ramp up or down from a starting level to an ending level. The amplitude is then selected for that portion of the waveform. Next, the time for the second portion of the waveform is selected, as well as the amplitude. Once these parameters are set, the ENTER key is used to accept them. Waveforms can then be saved with a location number and recalled.

A JOB can be created as a set of several waveforms that are to be generated consecutively for a period of time for each waveform. For example, each stored waveform can be placed in a specific order and generated for a specified time. JOBS can then be saved and stored using a JOB location number. An entire PROCESS is defined as a series of JOBs. The PROCESS can be created by recalling stored JOBs in whatever order is desired. The result is a non-periodic complex waveform which can be created by a sum of periodic waveforms, and can be easily programmed by the user with the flexibility needed to fine tune a PROCESS for optimal plating of a complex surface.

By allowing the user to program complex waveform outputs as a sum of JOBS, multiple steps in a plating process can be achieved during a single plating stage rather than having to move an object to separate tanks to perform different tasks at other stages in the plating process. For example, when plating a printed circuit board, one may wish to plate the feed-through holes or vias using a periodic pulse reverse waveform. Since such a step leaves a dull or matte finish, a subsequent gradient or ramp up to a DC waveform, or a straight DC waveform may be desired to add a bright finish to the surfaces. While prior art devices would require such a combination of steps to be done as different stages during the plating process, for example, by moving the object into another tank and beginning a new plating stage, the present invention allows the user to combine multiple tasks into a single stage by programming different steps in a single complex waveform PROCESS.

The user interface 500 can optionally be implemented via a remote port by a computer running software, or controller (PLC). Such a configuration would allow creation of a complex waveform using continuous communication from the computer or PLC to the rectification portion 330 using a single command, such as "Set Amps." The computer or PLC would thus control the time, amplitude, and polarity of the desired signal Is(t).

An optional process feedback system can be implemented to measure any plating variable, for instance, resistance barrier layers at the cathodic surface. Such information is fed back to the secondary rectification portion 330 in the form of a voltage or current signal. The output can then be modulated in proportion to the feedback signal and according to variables set by the user in order to compensate for plating process variables in a closed loop system. The user may view the feedback signal on the LCD display panel (or computer monitor), and set reference and factor parameters to determine the behavior of the system based on the equation:

$$Af = Ai + K * Delta,$$

where Ai=Initial amplitude of output waveform,
Af=Final amplitude of output waveform,
K=Percentage factor, and
Delta=Af−Ai.

While the specific embodiments have been illustrated and described, numerous modifications come to mind without significantly departing from the spirit of the invention, and the scope of protection is only limited by the scope of the accompanying claims.

What is claimed is:

1. A power supply device for producing complex non-periodic waveforms from a sequence of user controlled waveforms comprising:
    a controller which measures an output signal and compares said output signal to a desired signal to produce an error signal;
    a user input device having means for allowing a user to create a non-periodic signal from a sequence of pre-programmed user controlled periodic waveforms, wherein instructions from a user are accepted to create said desired signal, said desired signal comprising a complex non-periodic waveform formed by the sequence of user controlled periodic waveforms; and, a power stage portion which receives an input signal, wherein said input signal is modified in response to said error signal to produce said output signal.

2. A power supply device according to claim 1, wherein said controller comprises an amplifier.

3. A power supply device according to claim 1, wherein said controller comprises a digital signal processor.

4. A power supply device according to claim 1, wherein said controller operates in a current mode.

5. A power supply device according to claim 1, wherein said controller operates in a voltage mode.

6. A power supply device according to claim 1, wherein said controller operates in a power mode.

7. A power supply device according to claim 1, wherein said user input device allows the user to
   select a plurality of pre-defined stored waveforms;
   modify said stored waveforms; and,
   arrange said stored waveforms in a sequence to create said desired signal.

8. A power supply device according to claim 7, wherein said user input device allows the user to modify said stored waveforms in a current mode, a voltage mode, or a power mode.

9. A power supply device according to claim 8, wherein said user input device allows the user to combine multiple steps of a plating process into a single plating stage, wherein said steps are performed by different portions of the complex waveform output.

10. A power supply device according to claim 7, wherein said user input device allows the user to modify said stored waveforms by setting at least one parameter from a set of parameters selected from the group consisting of average positive amplitude, average negative amplitude, net average amplitude, peak positive amplitude, and peak negative amplitude.

11. A power supply according to claim 7, wherein said user input device further allows the user to select a number of repetitions for each of said waveforms to create a plurality of segments of said waveforms, and wherein said input device allows the user to further modify said segments of waveforms.

12. A power supply according to claim 7, wherein said user input device comprises an input panel, said input panel comprising a display and a keypad, wherein the input device allows the user to select, modify, and arrange said waveforms using said keypad, and said display allows the user to view instructions entered using the keypad.

13. A power supply according to claim 7, wherein said user input device comprises a computer having circuitry or software which allows the user to enter instructions in order to select, modify, and arrange said waveforms.

14. A power supply according to claim 13, wherein said computer further allows the user to select a number of repetitions for each of said waveforms to create a plurality of segments of said waveforms, and wherein said computer allows the user to further modify said segments of waveforms.

15. A power supply according to claim 1, further comprising an input filter and rectification circuitry, said input filter being supplied with an initial AC signal and filtering said AC signal to produce a filtered signal which is fed to said rectification circuitry, said rectification circuitry converting the filtered signal to a DC signal, the input signal comprising said DC signal.

16. A power supply according to claim 15, wherein said error signal comprises a modulation signal and a polarity signal, and wherein said power stage portion comprises:

a full bridge inverter which accepts the input signal and converts the input signal into high frequency pulses, the magnitude of said pulses varying in response to the modulation signal;

a high frequency transformer for stepping up or stepping down the high frequency pulses;

a rectification section for rectifying the high frequency pulses either positively or negatively in response to the polarity signal to produce a rectified signal; and, a demodulator for demodulating the rectified signal to produce said output signal.

17. A power supply according to claim 1, wherein said power stage comprises separate positive and negative rectification portions, said rectification portions being followed by a half bridge semiconductor switch and an LC filter comprising a coupled inductor, wherein rapid transitions between positive and negative output are produced in close synchronicity with the desired output signal.

18. A power supply according to claim 1, wherein said power stage comprises polarity reverse logic circuitry formed using non-diode semiconductor switches.

19. A method of controllably supplying power for electrolytic plating using a power supply device comprising the steps of:

measuring an output signal using a controller, and comparing said output signal to a desired signal to produce an error signal;

entering instructions into an input device to create said desired signal, said instructions comprising specifications for forming a non-periodic signal formed from a sequence of preprogrammed user controlled waveforms, said desired signal comprising a complex non-periodic waveform formed by the sequence of user controlled periodic waveforms; and, modifying an input signal using a power stage portion in response to said error signal to produce said output signal.

20. A method of controllably supplying power for electrolytic plating using a power supply device according to claim 19, wherein the step of entering instructions further comprises the steps of:

selecting a plurality of pre-defined stored waveforms;

modifying said stored waveforms; and, arranging said stored waveforms in a sequence to create said desired signal.

21. A method of controllably supplying power for electrolytic plating using a power supply device according to claim 20, wherein the step of modifying said stored waveforms comprises setting at least one parameter from a set of parameters selected from the group consisting of average positive amplitude, average negative amplitude, net average amplitude, peak positive amplitude, and peak negative amplitude.

22. A method of controllably supplying power for electrolytic plating using a power supply device according to claim 20, wherein the step of modifying said stored waveforms further comprises the step of selecting a number of repetitions for each of said waveforms to create a plurality of segments of said waveforms, and further modifying said segments of waveforms.

* * * * *